(No Model.) 2 Sheets—Sheet 1.

J. C. CULBERTSON.
CORN HARVESTER.

No. 564,872. Patented July 28, 1896.

WITNESSES:

INVENTOR:
John C Culbertson,
by Louis Bagger & Co.
his Attorneys.

(No Model.)  2 Sheets—Sheet 2.

J. C. CULBERTSON.
CORN HARVESTER.

No. 564,872. Patented July 28, 1896.

WITNESSES:

INVENTOR:
John C. Culbertson,
by Louis Bagger & Co.
his Attorneys.

UNITED STATES PATENT OFFICE.

JOHN CALVIN CULBERTSON, OF LEXINGTON, OHIO.

CORN-HARVESTER.

SPECIFICATION forming part of Letters Patent No. 564,872, dated July 28, 1896.

Application filed January 24, 1895. Serial No. 536,071. (No model.)

*To all whom it may concern:*

Be it known that I, JOHN CALVIN CULBERTSON, a citizen of the United States, and a resident of Lexington, in the county of Richland and State of Ohio, have invented certain new and useful Improvements in Corn-Harvesters; and I do hereby declare that the following is a full, clear, and exact description of the invention, which will enable others skilled in the art to which it appertains to make and use the same, reference being had to the accompanying drawings, which form a part of this specification, and in which—

Figure 1:
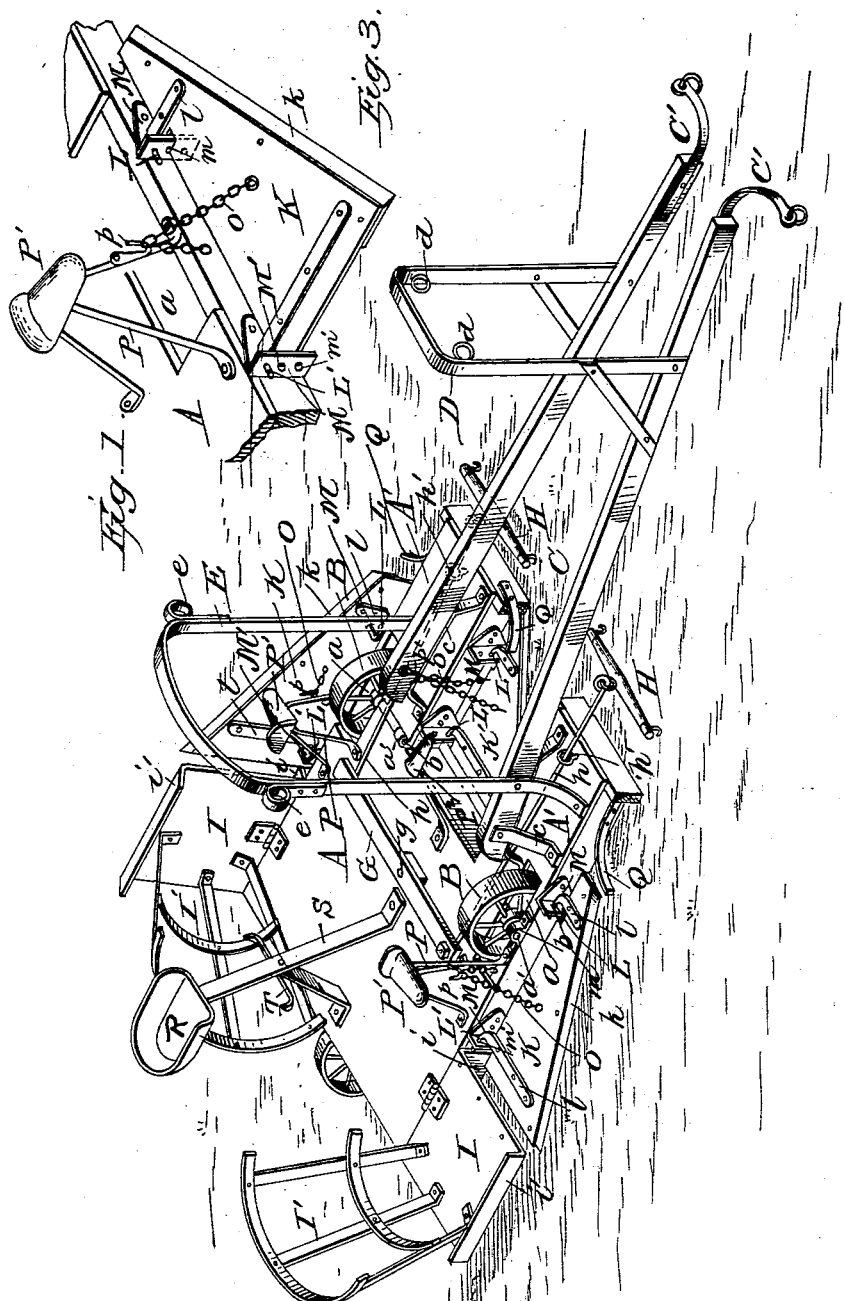
Figure 2:
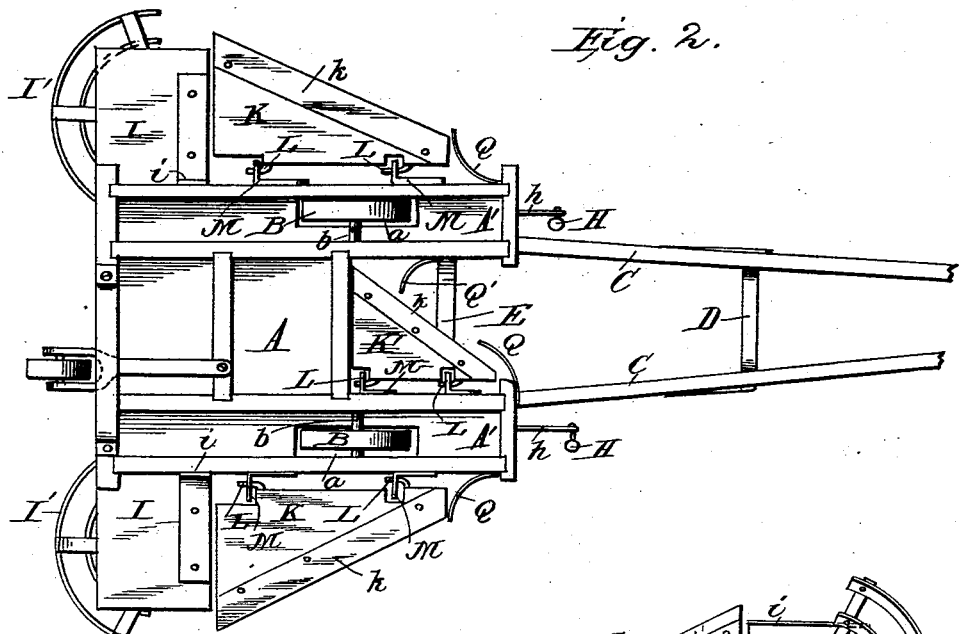
Figure 4:
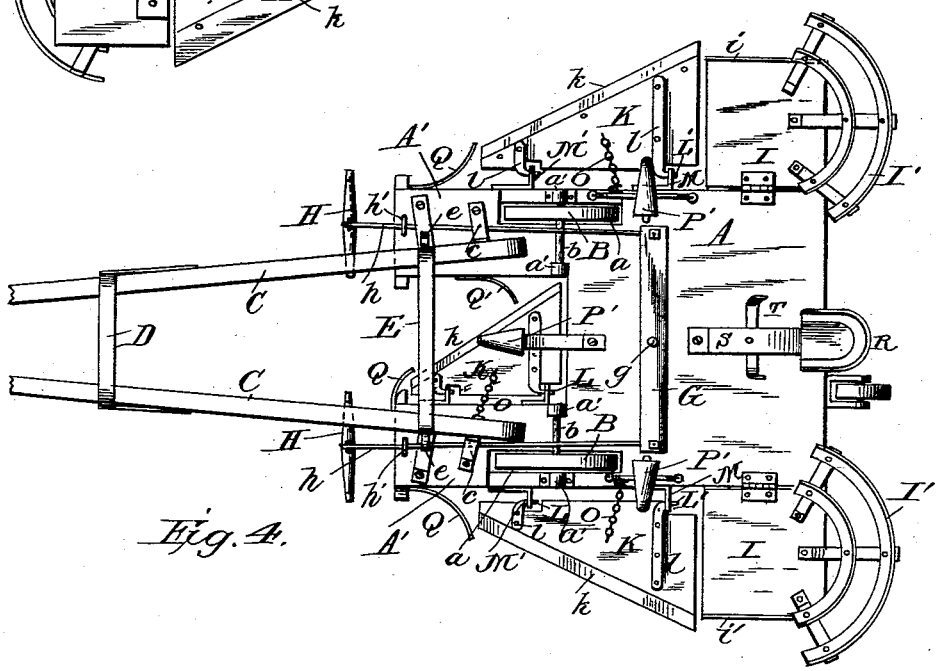

Figure 1 is a perspective view of my improved corn-harvester, one of the side wings and shock-racks being shown as folded up to be out of the way in passing gallows. Fig. 2 is a plan of the under side of the harvester. Fig. 3 is a detail view of one of the adjustable and removable wings or cutters, showing the manner of raising or lowering the same; and Fig. 4 is a top view or plan of the machine with all the wings extended and adjusted ready for harvesting corn.

Like letters of reference designate corresponding parts in all the figures.

My invention has relation to corn-harvesters of that type which consist, essentially, of a wheeled frame or platform provided with a driver's seat and having hinged to its sides adjustable triangular wings, which have a sharp oblique cutting edge, and may be extended and adjusted so as to cut the cornstalks as the machine passes between or over the rows. In machines of this type it is desirable to accomplish the greatest amount of work in the least possible time and by the assistance of as few hands as possible, and also to attach the triangular cutting-wings to the frame in such a manner that they can easily be detached from the wheeled frame or platform for sharpening when required, and also so that they may be easily adjusted upon the frame up or down to regulate the height or distance from the ground at which the stalks are to be cut.

With these objects in view my invention consists in the improvements which will be hereinafter more fully described and claimed.

Referring to the accompanying two sheets of drawings, the reference-letter A denotes a platform, made preferably of wood, and having two parallel extensions A' A' at its front end. At the point where these extensions join the main platform A there are two slots $a\ a$, one on each side, in which run the wheels B B, the shafts $b\ b$ of which are journaled in boxes $a'\ a'$ on the frame or platform.

Upon the parallel extensions A' A' is secured, by means of braced bearings $c\ c$, the tongue C, which consists of two outwardly-converging bars connected by arches D and E, one of which, D, is provided with rings $d\ d$, forming guides for the checkrein, while the rearmost arch E has fixed loops $e\ e$ at its upper corners, which form guides and supports for the lines. These (not shown on the drawings) should be of such length as to reach back of the elevated driver's seat, (shown at F.)

Upon a bolt $g$, inserted into platform A in front of the driver's seat, is pivoted the doubletree G, to the ends of which draft-rods $h\ h$ are articulated for the attachment of the singletrees H H, the draft-rods $h$ passing through eyebolts or guides $h'$, secured in the front end of the platform extension A'. To the outer ends of the tongue-bars C C are fastened the neck-yoke irons C' C'.

To opposite sides of platform A, at its extreme rear end, are hinged the folding shock-racks, which consist, each, of a flat table or platform I and an upright open-work frame or basket I', the under side of the hinged platform I being provided with a depending right-angled arm $i$, which, by abutting against the adjacent side of the main frame A when the rack is in its down or operative position, forms a combined stop and support for the rack-table I, keeping the same projecting at right angles from the platform and level therewith. The free end of the rack-table I is turned up at right angles, forming a flange $i'$.

Immediately in front of each of these folding shock-racks I I' is hinged a removable and adjustable cutting-wing K, made of any suitable metal, triangular in shape, and provided with a steel cutting edge $k$ along the oblique side forming the hypotenuse of the triangle. To the upper face of this triangular plate are riveted two flat parallel bars $l\ l$, the projecting ends of which are shaped to form pintles L L', adapted to be inserted into a registering pair of apertures $m\ m'$ in two brackets M and M', which are bolted upon and project from opposite sides of the harvester-platform. This construction and arrangement not only admits of the easy removal of the cutter-wings when it is desired to sharpen them, but by shifting the pintles L L' from one set of registering apertures to another the triangular cutters may be raised or lowered at their point of attachment to the frame.

If it is desired to cut the cornstalks off horizontally or by a straight cut, the hinged and adjustable cutting-wings K K should be adjusted horizontally, while, on the other hand, if it should be desired to sever the stalks obliquely or by a slanting cut, the outer cutting edge $k$ of the wings K should be raised at an angle or incline corresponding to the angle of the cut. This adjustment is effected in an easy, simple, and expeditious manner by means of a chain O, which is fastened at one end upon the triangular cutter-plate, while its free end may be fastened to the seat-standard P, appertaining to that particular wing, by hooking one of the chain-links upon the hook $p$.

The seat-standard P carries a saddle P', upon which is seated the man who handles and shocks the corn cut by the cutting-wing in front of him. There is one of these triangular cutting-wings K on each side of the large platform A, the point of each cutter being just back of a yielding guide Q, which consists of a flat steel spring fastened at one end to the side of the appropriate platform extension A', and bent or deflected outwardly at its free end, where it slightly overlaps the extreme point of the cutter just back of it. This spring guides or deflects the stalks of corn in against the sharp cutting edge $k$, and prevents any of the stalks from passing into the narrow space or opening between the side of the frame and wing.

A third cutting-wing K', of precisely the same construction and arrangement as the two side cutters K K, is located in the rectangular open space between the platform extensions A' A', to the inner side of one of which it is hinged adjustably by means of pintles L and apertured brackets or bearings M. In rear of and above the central knife is a seat P² for the operator who attends to that cutting-wing, the adjusting-chain O appropriate to this cutter being hooked by one of the links of the free end upon a hook $p'$, fastened in the tongue-beam. A spring-guide Q is fastened to the forward end of the frame, so as to overlap with its free end the forward point of this third or central cutter, and an auxiliary or additional spring-guide Q' is fastened upon the frame opposite to the oblique cutting edge of this wing, the function of which is to guide the cornstalks of the central row up against this middle cutter.

The letter R designates the driver's seat, mounted upon a support S, secured to the platform A. Secured to this support about midway of its height is a catch T, consisting of a plate or bar of spring metal having its ends bent backwardly and adapted to engage with the baskets I I' when folded and hold them in position.

Having thus described my invention, I claim and desire to secure by Letters Patent of the United States—

In a corn-harvester, the combination with the platform A, the folding racks hinged thereto, provided at the inner ends with downwardly-extending arms and at the outer ends with upwardly-extending flanges, and the open frames or baskets secured to said racks, of the driver's seat, the support secured to said platform, on which said seat is mounted, and the spring-plate secured to said support, having its ends bent upwardly at an angle, substantially as described.

In testimony that I claim the foregoing as my own I have hereunto affixed my signature in presence of two witnesses.

JOHN CALVIN CULBERTSON.

Witnesses:
JOHN G. WALKER,
WARREN ADAMSON.